United States Patent [19]

Mori

[11] 4,420,796
[45] Dec. 13, 1983

[54] DEVICE FOR DISPERSING LIGHT RAYS ISSUING FROM A LIGHT GUIDE

[76] Inventor: Kei Mori, 3-16-3-501, Kaminoge, Setagaya-ku, Tokyo, Japan

[21] Appl. No.: 350,058

[22] Filed: Feb. 18, 1982

[30] Foreign Application Priority Data

Feb. 24, 1981 [JP] Japan .................. 56-26291

[51] Int. Cl.³ .............................. F21V 7/04
[52] U.S. Cl. ................... 362/32; 362/158; 362/218; 362/223; 362/267; 362/294; 362/335; 362/340; 362/355; 362/361; 362/362; 362/373; 362/375
[58] Field of Search ............. 362/32, 158, 223, 218, 362/267, 294, 335, 340, 355, 361, 362, 373, 375

[56] References Cited
U.S. PATENT DOCUMENTS 3,439,157 4/1969 Myles .................... 362/32
4,297,000 10/1981 Fries ..................... 362/32

Primary Examiner—Stephen J. Lechert, Jr.
Attorney, Agent, or Firm—Merchant, Gould, Smith, Edell, Welter & Schmidt

[57] ABSTRACT

A simple compact robust device for dispersing light rays issuing from a light guide. The device has an elongated body of a rigid transparent material, an end of the body being tapered to define an inclined nearly conical peripheral surface, so that those light rays, entering into the body at a small angle with respect to the longitudinal axis of the elongated body, are reflected back into the body by the internal boundary of the inclined surface and are directed to propagate at a larger angle, whereby collimated light rays, issuing from the light guide, are dispersed. The device is particularly useful in lighting systems utilizing solar radiation as a light source.

4 Claims, 3 Drawing Figures

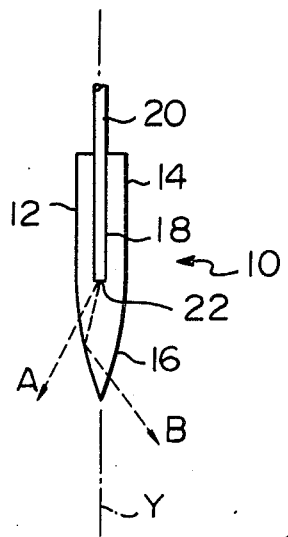
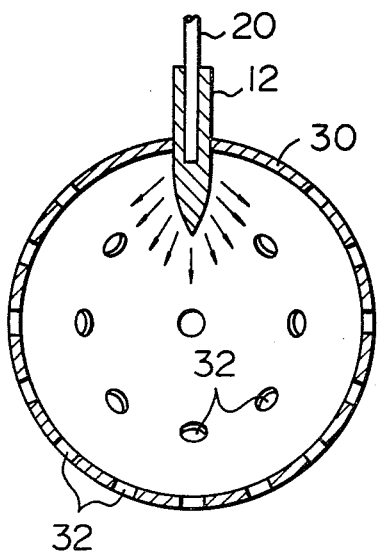

DEVICE FOR DISPERSING LIGHT RAYS ISSUING FROM A LIGHT GUIDE

This invention relates, broadly, to a lighting system utilizing especially, but not exclusively, solar radiation as a source of light energy and wherein a light guide, such as an optical fiber bundle, is employed to conduct light energy from a light source. More particularly, this invention relates to a device, for use in the lighting system of the nature described, for dispersing light rays being transmitted through and issuing out of a light guide.

The use of visible light energy from solar radiation for interior lighting purposes has been proposed and various lighting systems utilizing solar radiation have been contemplated. Such lighting systems generally comprise a solar beam receiver for collecting and collimating solar radiation and a light guide for conducting light energy from the receiver to an area to be illuminated. The lighting system utilizing solar radiation as a source of light energy has acquired considerable industrial applicability because of the development of an optical fiber cable of a high quality. The optical fiber bundle, now available on the market, is not only able to transmit light energy at an extremely low transmission loss, but has sufficient flexibility to enable light rays to be conducted along a curved complex optical path provided between a light source and the area to be illuminated. An optical fiber cable or bundle comprises a plurality of individual optical fibers, each consisting of a central core glass and a surrounding clad layer. During transmission through the core glass, those light rays having an angle of incidence smaller than the critical angle of incidence of the core forming glass are not totally reflected by the interface or boundary defined between the core and clad and, therefore, penetrate wholly or partially therethrough toward the clad layer to leak out of the optical fiber. Thus, only those light rays having an angle of incidence larger than the critical angle of incidence of the core material are totally reflected by the boundary and, on repeating reflection, transmit throughout the fiber. This results in the cone angle, defined by issuing light rays at the exit end of the optical fiber, being limited so that if light rays are allowed to issue out of the end of the optical fiber cable, illumination takes place only in a spotlight-like fashion. Normally, the cone angle of light rays issuing from an optical fiber cable does not exceed about 48 degrees for an optical fiber cable having a value of numerical aperture (NA) of about 0.2.

It has also been proposed to use solar radiation for underwater lighting purposes. A solar receiver or collector is provided on the sea or water surface and an optical fiber cable may be extended therefrom to the bottom of the body of water. The visible or non-visible light energy conducted through the fiber cable is used to illuminate areas underwater, so that fishes can be gathered or plant planktons or edible sea vegetables can be raised. In the case of lighting an aerial space with the optical fiber cable, there is a substantial refraction at the exit end of the cable due to difference between indices of refraction of two adjacent mediums, because light rays transmit from the core glass, which has a high index of refraction, to the air, which has a low index of refraction. However, when the optical fiber cable is placed in an aqueous medium, such as water for underwater illumination purposes, the core glass of the cable is obliged to contact the water. The index of refraction of water is lower than that of the core glass but is higher than that of the air. Thus, the difference of indices of refraction between the core glass and water is little, so that the cone angle of issuing light rays is further narrowed.

Therefore, an object of the present invention is to provide a device for dispersing and diffusing light rays issuing from a light guide, which device is simple in construction and easy to manufacture.

Another object of the invention is to provide a device of the kind described which is effectively operable, even in an aqueous medium.

According to the invention, there is provided a device for dispersing light rays issuing from a light guide, which comprises an elongated body of a rigid transparent material, said body having adjacent an end thereof a central opening for receiving therein an end of a light guide in a light transmitting relationship, the other end of said body being tapered to define a nearly conical peripheral surface tapering toward a point located in alignment with the longitudinal axis of the body remote from said opening. With this construction, light rays, entering from said light guide into said body at a small angle of intersection with respect to the longitudinal axis of the body, are reflected back into the body at least one time by the internal boundary of the nearly conical peripheral surface and, thus, propagate through the body at a larger angle of inter section with respect to the body axis, so that light rays issuing from the light guide, are dispersed around the tapered end as they leave the body. The body of the device according to the invention may be made from any suitable rigid transparent material, such as acrylic resins and glass, but acrylic resins are preferable, since glass absorbs the reddish component in the spectrum of light.

Preferably, the peripheral surface of the body member may be rounded toward the tapered end, in such a manner that the angle, formed between the body axis and the line tangential to the surface in a plane of the body axis, gradually increases toward the tapered end, so that the luminous intensity, per unit surface area of the peripheral surface of the body member, is uniformly distributed over the surface.

The tapered end of the body may be enclosed with a rigid transparent protective housing, in order to prevent human body or inflamable materials from contacting thereto.

Preferably, the protective housing is hermetically sealed to prevent water from entering into the housing when the device is submerged underwater. This housing ensures that the tapered end of the body is surrounded by an air layer, so that a high difference is maintained between the indices of refraction at the boundary of the peripheral surface of the body, thereby enabling the device to operate even underwater.

The sealed protective housing may be filled with a pressurised inert gas, such as nitrogen, carbon dioxide or argon, in order to enhance the sealability of the housing at a high water pressure.

The invention will now be described in more detail with reference to the embodiments thereof illustrated in the accompanying drawings, in which:

FIG. 1 is a cross-sectional elevational view of the device according to the invention;

FIG. 2 is a cross-sectional elevational view of another embodiment provided with a protective housing; and, FIG. 3 is a cross-sectional elevational view of a further embodiment having a sealed housing.

Referring to FIG. 1, there is shown a light dispersing device 10 comprising an elongated body 12 made from transparent rigid acrylic resins. The body 12 consists of an upper cylindrical portion 14 and a lower tapered portion 16 integral to the upper portion. The cylindrical portion 14 is provided with a cylindrical central opening 18 in the form of a blind bore in which an end of an optical fiber bundle 20 is closely fitted. The other end, not shown, of the optical fiber bundle 20 is optically connected to a light source, such as a solar receiver or collector, so that visible light rays are introduced into the optical fiber bundle and are conducted therethrough. The end 22 of the fiber bundle inserted into the central opening 18 is cut perpendicular to the logitudinal axis Y of the body 12 to mate with the bottom of the opening 18 and is firmly bonded thereto by suitable transparent adhesives. The tapered portion 16 defines a nearly conical peripheral surface which is slightly rounded or curved toward the lowermost end, so that the angle formed between the axis of the body and the line tangential to the surface in a plane passing through the body axis gradually increases toward that end.

In operation, light rays are allowed to issue from the light emitting end 22 of the optical fiber bundle 20. Those light rays, having a large angle of intersection with respect to the axis Y, arrive at the internal boundary of the tapered surface at a small angle of incidence and thus pass therethrough as shown by arrow A. However, those light rays having a small angle of intersection reach the internal boundary at a larger angle of incidence and are reflected totally or partly back into the body as shown by arrow B. As the surface of the tapered portion is inclined with respect to the body axis Y, the reflected light rays B have a larger angle of intersection with respect to the axis Y and it is then possible for these reflected rays to pass through the opposite boundary surface. Those light rays having a further smaller angle of intersection will be reflected more than one time before they leak out of the body. Thus, the angle of cone of light rays issuing from the optical fibers is increased as light rays finally leave the light ray dispersing device of the invention.

In the illustrated embodiment, the peripheral surface of the tapered portion is rounded. This is to prevent the majority of light rays from leaving the area of the surface located in the close vicinity of the light emitting end 22 of the fiber bundle and to ensure that the luminous intensity per unit surface area of the tapered portion's surface is uniformly distributed over the surface. However, the configuration of the tapered portion is not limited to that illustrated and, instead, the tapered portion may be shaped in any other suitable manner.

FIG. 2 shows another embodiment of the invention, wherein like parts are indicated by like reference numerals. In this embodiment, the tapered portion 16, particularly the pointed end thereof, is encapsulated within a protective housing 30 secured to the body 12. The protective housing 30 has a spherical configuration and is made from a similar rigid transparent material, such as acrylic resins. A plurality of apertures 32 are formed on the housing wall to allow cooling air to enter into the housing. The protective housing according to this embodiment ensures isolating the pointed end of the tapered portion from other accessible materials or the human body and, thus, prevents the operator from being burned or injured by the heated pointed end of the device, as well as preventing a fire hazard from occurring when an inflamable material comes close thereto. As an alternative, the protective housing may be made from a network of metal wires or other sufficiently rigid material formed into a spherical shape.

FIG. 3 illustrates another embodiment of the invention which is designed for lighting areas underwater. The tapered portion 16 of the device is enclosed by a liquid tight protective housing 40 which is sealingly secured to the cylindrical portion 14 to prevent water from entering into the housing. With this arrangement, the tapered portion is always surrounded by an air layer, even though the device is submerged underwater. This ensures refraction to take place as light rays pass from the body of acrylic resins to air and also ensures reflection to take place at the boundary of the tapered portion, such that light rays are dispersed in the same manner as when the device is operated in ambient air. This embodiment is particularly useful in underwater illumination for the purposes of artificially growing edible sea herbes or raising fishes on the sea bottom or in the sea. The underwater lighting system utilizing the optical fiber cable and the light dispersing device according to the invention does not need an electrical element and, thus, is free from the problem of electric leakage that would occur in an electric lighting system. Preferably, the protective housing 40 is filled in with a pressurised inert gas, such as nitrogen, carbon dioxide or argon, in order to reduce the pressure difference between the housing and the surrounding water and to improve the seal of the housing.

I claim:

1. A device for dispersing light rays issuing from a light guide, which comprises: an elongated body of a rigid transparent material, said body having adjacent an end thereof a central opening for receiving therein an end of a light guide in a light transmitting relationship, the other end of said body being tapered to define a peripheral surface tapering toward a point located in alignment with the axis of the body remote from said opening, said peripheral surface is curved toward said tapered end, so that the angle formed between the axis of the body and the line tangential to said surface in a plane of said axis gradually increases toward said tapered end, so that those light rays, entering from said light guide into said body at a small angle of intersection with respect to the axis of the body, are reflected back into the body at least one time by the internal boundary of said peripheral surface, thereby to propogate through said body at a larger angle of intersection with respect to said axis, whereby light rays issuing from the light guide, are dispersed as they leave said body.

2. A device as claimed in claim 1, characterized in that said tapered end is enclosed with a rigid transparent protective housing, said housing being hermetically sealed to prevent water from entering into said housing.

3. A device as claimed in claim 2, characterized in that a pressurized inert gas is contained in said sealed housing.

4. A device as claimed in claim 1 characterized in that said tapered end is enclosed with a rigid transparent protective housing, said housing having a wall including a plurality of cooling apertures formed on said housing wall.

* * * * *